United States Patent
Jobling et al.

(10) Patent No.: US 10,546,274 B2
(45) Date of Patent: Jan. 28, 2020

(54) TRAVEL ENVIRONMENT CONTROL

(71) Applicant: British Airways Plc, West Drayton (GB)

(72) Inventors: Daniel Jobling, West Drayton (GB);
Estelle Levacher, West Drayton (GB);
Glenn Morgan, West Drayton (GB)

(73) Assignee: British Airways Plc, Harmondsworth, West Drayton (GB)

( * ) Notice: Subject to any disclaimer, the term of this patent is extended or adjusted under 35 U.S.C. 154(b) by 346 days.

(21) Appl. No.: 15/128,946

(22) PCT Filed: Mar. 24, 2015

(86) PCT No.: PCT/GB2015/050882
§ 371 (c)(1),
(2) Date: Sep. 23, 2016

(87) PCT Pub. No.: WO2015/145142
PCT Pub. Date: Oct. 1, 2015

(65) Prior Publication Data
US 2018/0181919 A1     Jun. 28, 2018

(30) Foreign Application Priority Data

Mar. 24, 2014  (GB) .................................. 1405201.3

(51) Int. Cl.
*G06Q 50/10* (2012.01)
*G06Q 10/10* (2012.01)
(Continued)

(52) U.S. Cl.
CPC .......... *G06Q 10/1093* (2013.01); *B60Q 3/44* (2017.02); *B60Q 3/47* (2017.02); *B64D 11/0007* (2013.01);
(Continued)

(58) Field of Classification Search
CPC .. G06Q 10/1093; G06Q 10/025; G06Q 50/14; G06Q 50/30; B64D 13/06;
(Continued)

(56) References Cited

U.S. PATENT DOCUMENTS 6,059,364 A * 5/2000 Dryburgh ............. A47C 1/0352
297/354.13
7,878,586 B2  2/2011 Kneller et al.
(Continued)

FOREIGN PATENT DOCUMENTS

| EP | 2639156 A2 | 9/2013 |
|---|---|---|
| WO | WO 2007/072045 A2 | 6/2007 |
| WO | WO 2009/066054 A2 | 5/2009 |

OTHER PUBLICATIONS

Liu, Hao, Ben Salem, and Matthias Rauterberg. "Toward next-generation in-flight entertainment systems: a survey of the state of the art and possible extensions." Advances in semantic media adaptation and personalization, vol. 2 2 (2009): 95. (Year: 2009).*

(Continued)

*Primary Examiner* — Genna M Mott
(74) *Attorney, Agent, or Firm* — Sterne, Kessler, Goldstein & Fox P.L.L.C.

(57) ABSTRACT

A system and method for controlling the travel environment for a passenger are described, in which passenger data is obtained from an existing source of stored data, the stored data including information on the passenger's itinerary. One or more sensor inputs are received, providing information on the physiological state of the passenger and/or environmental conditions in the vicinity of the passenger. One or more outputs are provided to control the passenger's travel environment based on the passenger data and the one or more sensor inputs. A system and method of dynamic travel event scheduling is also described, in which a dynamic event (Continued)

schedule is generate based on the retrieved data, the dynamic event schedule including at least one event associated with at least one action output.

12 Claims, 10 Drawing Sheets

(51) Int. Cl.
```
B64D 11/06      (2006.01)
B60Q 3/44       (2017.01)
B60Q 3/47       (2017.01)
B64D 11/00      (2006.01)
B64D 13/06      (2006.01)
```

(52) U.S. Cl.
CPC ............ *B64D 11/064* (2014.12); *B64D 13/06* (2013.01); *B64D 2011/0053* (2013.01)

(58) Field of Classification Search
CPC .............. B64D 11/0007; B64D 11/064; B64D 2011/0053; B60Q 3/44; B60Q 3/47
See application file for complete search history.

(56) References Cited

U.S. PATENT DOCUMENTS

| | | | |
|---|---|---|---|
| 8,576,064 B1 | 11/2013 | Mitchell | |
| 9,523,985 B1 * | 12/2016 | Barnes | ................. G05D 1/0653 |
| 2005/0283039 A1 * | 12/2005 | Cornel | ................. A61M 21/00 |
| | | | 600/27 |
| 2007/0282159 A1 * | 12/2007 | Sato | ....................... A61M 21/00 |
| | | | 600/27 |
| 2009/0112638 A1 | 4/2009 | Kneller | |
| 2009/0187640 A1 | 7/2009 | Delia | |
| 2009/0192659 A1 | 7/2009 | Beebe | |
| 2013/0074108 A1 | 3/2013 | Cline | |
| 2013/0099011 A1 * | 4/2013 | Matsuoka | .......... G05D 23/1904 |
| | | | 236/1 C |
| 2013/0338857 A1 * | 12/2013 | Sampigethaya | ..... A61B 5/6887 |
| | | | 701/3 |

OTHER PUBLICATIONS

Liu, Hao, Jun Hu, and Matthias Rauterberg. "Software architecture support for biofeedback based in-flight music systems." Computer Science and Information Technology, 2009. ICCSIT 2009. 2nd IEEE International Conference on. IEEE, 2009. (Year: 2009).*

Liu, Hao, and Matthias Rauterberg. "Context-aware in-flight entertainment system." Proceedings of Posters at (2007): 1249-1254. Year: 2007).*

International Preliminary Report on Patentability and Written Opinion of the International Searching Authority for PCT/GB/2015/050882, dated Oct. 6, 2016.

* cited by examiner

TRAVEL ENVIRONMENT CONTROL

FIELD OF THE INVENTION

The present invention relates to systems and methods for controlling a travel environment, such as for example in an aircraft cabin, so that the travel environment is personalised to the individual passenger.

BACKGROUND OF THE INVENTION

In the field of passenger travel, various measures have been introduced to improve comfort and convenience for the passenger, such as by allowing the seat to be modified between different positions as disclosed for example in WO-A-2007/072045 and WO-A-2009/066054. Various alternative measures for improving the passenger environment have been studied in the SEAT (Smart tEchnologies for stress free Air Travel) project. It is also known from U.S. Pat. No. 7,878,586 to store user profile data to control the environment automatically, although it is not known whether these proposals have ever been put into operation.

One aim of controlling the travel environment has been to alleviate travel fatigue, also commonly referred to as 'jet lag', for example by controlling lighting within an aircraft cabin. Jet lag may also be addressed by controlling a passenger's sleep, eating and exercise patterns. Mobile apps, such as 'Jet Lag Fighter' from Virgin Atlantic, allow the user to enter personal data such as age, gender and health status, and provide a personalised programme to alleviate jet lag.

What is desired is a system that facilitates greater efficiencies within the aircraft travel environment and enables improved control and personalisation of the passenger's travel environment, in particular for enhanced passenger wellness and wellbeing when flying.

STATEMENTS OF THE INVENTION

Aspects of the present invention are set out in the accompanying claims.

According to one aspect, there is provided a system for controlling the travel environment for a passenger, in which passenger data is obtained from an existing source of customer data rather than requiring the passenger to enter their data manually. The customer data may include information on the passenger's travel itinerary. Additionally, one or more sensor inputs may provide information on the environmental conditions in the vicinity of the passenger. On the basis of the customer data and the sensor input(s), the system provides one or more outputs to improve the passenger's travel environment or experience.

According to another aspect of the present invention, the present invention provides a system for dynamic travel event scheduling, in which stored data including information relating to a passenger's itinerary is retrieved, the itinerary including at least one scheduled journey. The system generates a dynamic event schedule based on the retrieved data, the dynamic event schedule including at least one event associated with at least one action output. One or more sensor inputs are received, providing information on the physiological state of the passenger and/or environmental conditions in the vicinity of the passenger. In response, the system identifies one or more affected events of the dynamic event schedule based on the received sensor inputs, and provides one or more action outputs to control the passenger's travel environment based on the at least one event.

The outputs to control the passenger's travel environment may comprises one or more of signals to control one or more properties of a passenger seat, and control lighting and/or air conditioning above and/or around the passenger's seat.

The at least one event may be selected from a set of predefined events including: sleep, wake, stretch, exercise, eat, drink, stay awake, and engage in-flight entertainment. The sleep and wake events may be associated with respective action outputs to automatically control a recline position of the passenger's seat and a lighting level above or around the passenger's seat.

Each scheduled events may be associated with a respective timing parameter and wherein the system is further operable to update the travel path data by adjusting respective timing parameters of the one or more affected events.

The retrieved data may also include information relating to at least one of the passenger's personal preferences, an in-flight meal schedule, and an automated cabin lighting schedule.

The system may be further operable to generate data defining a dynamic event schedule is further operable to generate auxiliary data for an event defining the associated action output. A new event for the dynamic event schedule may be determined based on the received sensor inputs. The system may be further operable to output the travel path data as an interactive interface.

The sensor inputs may be received from one or more of: a temperature sensor, a lighting sensor, a humidity sensor, a body movement sensor, a sleep phase sensor, an eye movement sensor, a heart rate sensor, a body temperature sensor, and an ingestible sensor.

In other aspects, there are provided methods of operating the systems as described above. In another aspect, there is provided a computer program comprising machine readable instructions stored thereon arranged to cause a programmable device to become configured as the systems as described above.

BRIEF DESCRIPTION OF THE DRAWINGS

Specific embodiments of the invention will now be described, purely by way of example, with reference to the accompanying drawings in which:

FIG. 6, which comprises

DETAILED DESCRIPTION OF EMBODIMENTS

Figure 1:
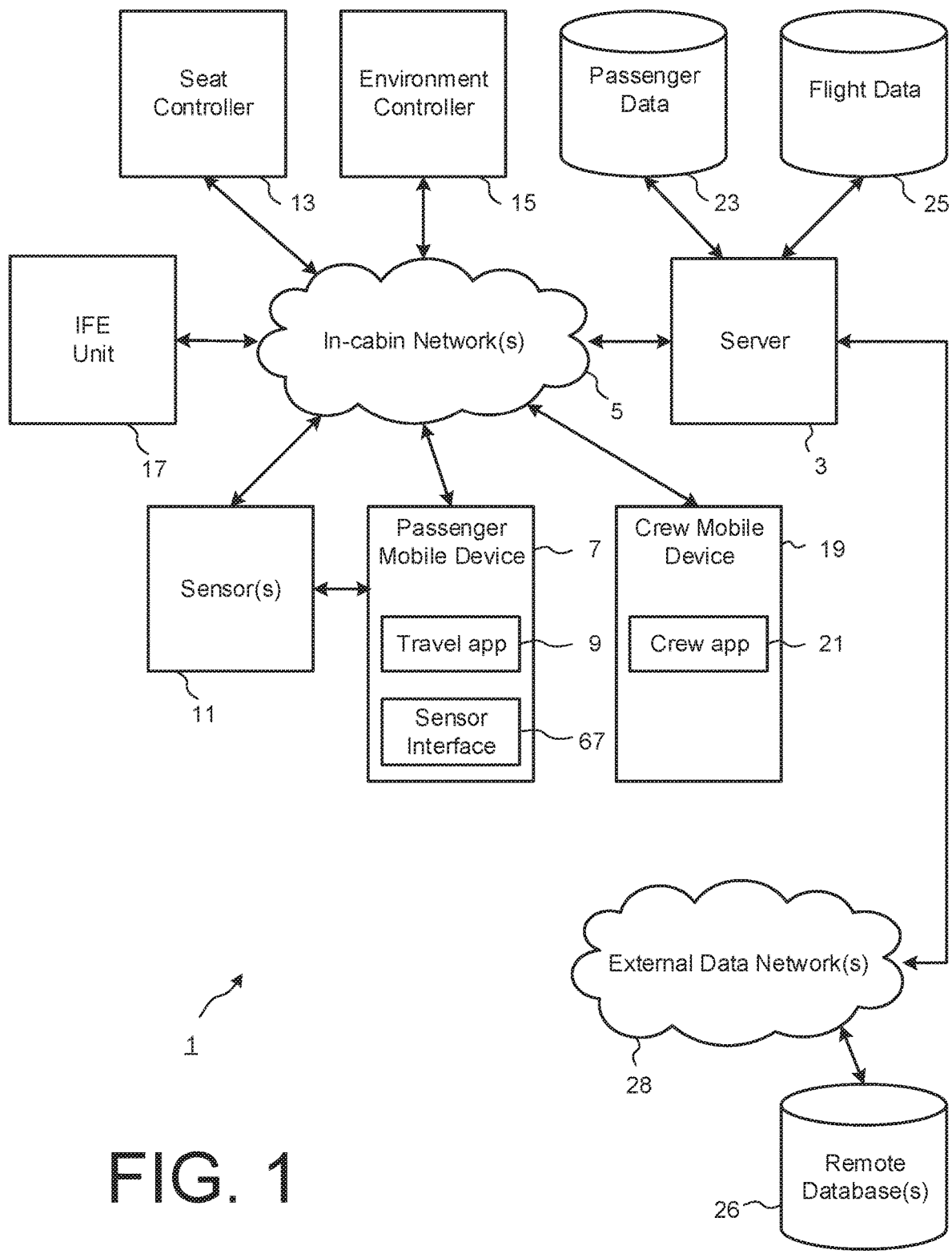
FIG. 1 is a block diagram of a system according to an embodiment of the invention.

FIG. 1 shows schematically the elements of a travel environment control system in an embodiment of the invention that relates to commercial air travel. Aspects of the invention may be applicable to other travel environments, such as trains, cars, buses, etc. At least some of the elements are optional, at least for certain applications.

In this embodiment, an automated system accesses customer data and environmental data relating to the local environment of a passenger, for example from sensors. On the basis of these inputs, the system is able to control the local environment according to the specific requirements of the passenger and the properties of the local environment. The system is also able to determine an event timeline for the passenger's optimal wellness, indicating events along the timeline and associated timing aspects, and dynamically adjust the event timeline in response to passenger and environment data from the sensors. The events may define automated control of the local environment. Specific examples and applications will be described below.

In the system 1 shown in FIG. 1, a server 3, located on board an aircraft, is in communication with one or more in-cabin networks 5, which connect the server 3 to a passenger's mobile device 7 running a travel app 9, one or more sensors 11, a seat controller 13 and an environment controller 15. An IFE (In-Flight Entertainment) unit 17 may also be connected to the server 3. The in-cabin network 5 may be a wired or wireless network, and may include one or more ad-hoc data connections between nodes in the network, such as the server 3 and the passenger's mobile device 7. The server 3 may also be in communication with a crew mobile device 19 via the in-cabin network(s) 5. The crew mobile device 19 may run a crew app 21, as described in more detail below. As another example, the in-cabin network 5 may include a mesh network, as is known in the art, with mesh nodes formed by one or more of the passenger's mobile device 7 and the crew mobile devices 19, as well as sensors 11, seat controllers 13 and environment controllers 15 adapted for ad-hoc network connectivity. It will be appreciated that such a mesh network can typically also include one or more mesh routers that forward data to and from one or more gateways, which may optionally be connected to the Internet.

The server 3 has access to customer data 23 and flight data 25, for example from one or more local databases and/or remote databases 26 accessible via one or more external data networks 28, such as the Internet. The customer data 23 may comprise customer biometric details such as age, gender, height, weight, etc., health status, and personal preferences, such as dietary requirements, sleeping habits etc. The customer data 23 may be provided by customer input, for example within a travel app 9 running on a passenger's mobile device 7 or via a web-based interface, or may be provided from a user profile within another service with which the user is registered, such as a social network. The customer data 23 may also comprise location data relating to the current or last-known geographical location of the passenger or the passenger's mobile device 7, for example from location tracking information received from the passenger's mobile device 7. Instead or additionally, the customer data 23 and flight data 25 may be stored in the passenger passenger's mobile device 7, and may be updated when the travel app 9 is connected to the server 3.

The flight data 25 is linked to the customer data 23 and includes data relating to flights that the customer has booked, checked in for, or boarded. The flight data 25 includes the timing and duration of the flight, as well as the departure and arrival points of the flight, and information of any connecting flights. The flight data 25 may also include information associated with in-flight aspects, such as meal and/or cabin lighting schedules for the specific flight, as well as information associated with offers for the customer, such as available flight upgrades.

In this embodiment, the travel app 9 on the passenger's mobile device 7 generates and outputs a dynamic event timeline based on the customer data 23 and flight data 25, and enables passenger interaction with the dynamic event timeline. The travel app 9 can also output control signals or messages to the seat controller 13, the environment controller 15 and/or the crew mobile device 19 and crew app 21. Alternatively or additionally, the server 3 may be configured to generate data associated with the dynamic event timeline based on the customer data 23 and flight data 25, and to transmit the generated data to the passenger's mobile device 7 for display by the travel app 9. The travel app 9 may be configured to run in the background, to collect and provide information to the server 3 on an ongoing basis, and to receive and process push updates and event triggers from the server 3.

Figure 2:
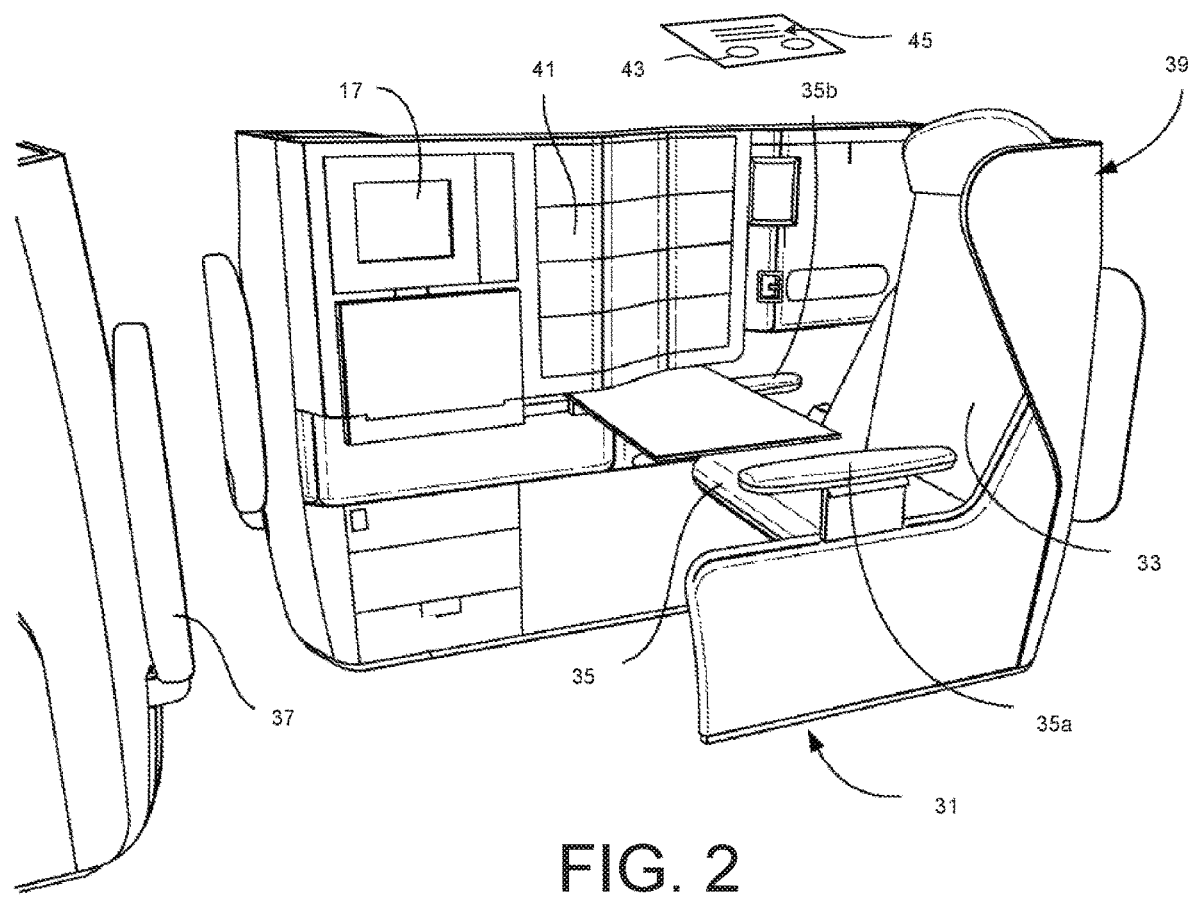
FIG. 2 is a perspective view of a seating unit to which the system may be applied.

The seat controller 13 may automatically control, without direct user input, one or more properties of a passenger seat 31, for example as shown in FIG. 2. In this example, the passenger seat 31 comprises a reclinable seat back 33 and a seat pan 35 that moves forward as the seat back 33 reclines, under the control of the seat controller 13. Arm rests 35a, 35b may drop as the seat reclines, again under the control of the seat controller 13. A foot rest 37 may drop or be adjustable, under the control of the seat controller 13. The seat may be contained within a housing 39, and separated from adjacent seats by a retractable privacy screen 41, both of which afford a degree of privacy to the passenger. The WE unit 17 is provided adjacent the seat 31.

The environment controller 15 may control the environment around the passenger, for example by controlling lighting 43 and/or air conditioning 45 above and/or around the passenger's seat 31.

The sensor(s) 11 may include one or more environmental sensors for collecting and providing data relating to aspects of the environment on board the aircraft, either locally to the passenger or within the cabin as a whole, such as:

temperature sensor(s) for sensing the air temperature within the cabin;

lighting sensor(s) for sensing the lighting level within the cabin;

humidity sensor(s) for sensing the humidity within the cabin;

pressure sensor(s) for sensing the air pressure within the cabin;

noise sensor(s) for sensing the ambient noise level within the cabin; and altitude sensor(s) for sensing the travelling altitude of the cabin, which may be the absolute, true, pressure or density altitude.

The sensor(s) 11 may also include one or more passenger sensors for collecting and providing data relating to aspects of the customer on board the aircraft, which can vary depending on the physiological state of the customer. The passenger sensors may be wearable by the passenger, separate from the passenger, or included within the passenger's mobile device 7, and include sensors such as:

Body movement sensors, for example using an accelerometer connected to the passenger, or using a camera;

Sleep phase or biorhythm sensors, for example using detected heart rate, movement, or EEG (electroencephalography);

Eye movement sensors, such as the camera or a dedicated eye tracking device

Heart rate or blood pressure sensors;
External body temperature sensors;
Digital pills or other ingestible sensors, that detect internal temperature, stomach acidity and other internal properties and wirelessly relay this information outside the passenger's body The passenger sensors may also be configured to collect data relating to aspects of the customer before boarding the flight, for example over a predefined period of time preceding a scheduled flight and/or on the day before boarding the scheduled flight. The pre-flight collected data can be stored by the respective passenger sensors and/or provided to the passenger's mobile device 7, for use in determining and scheduling events associated with the journey segments as will be described in more detail below.

Figure 3:
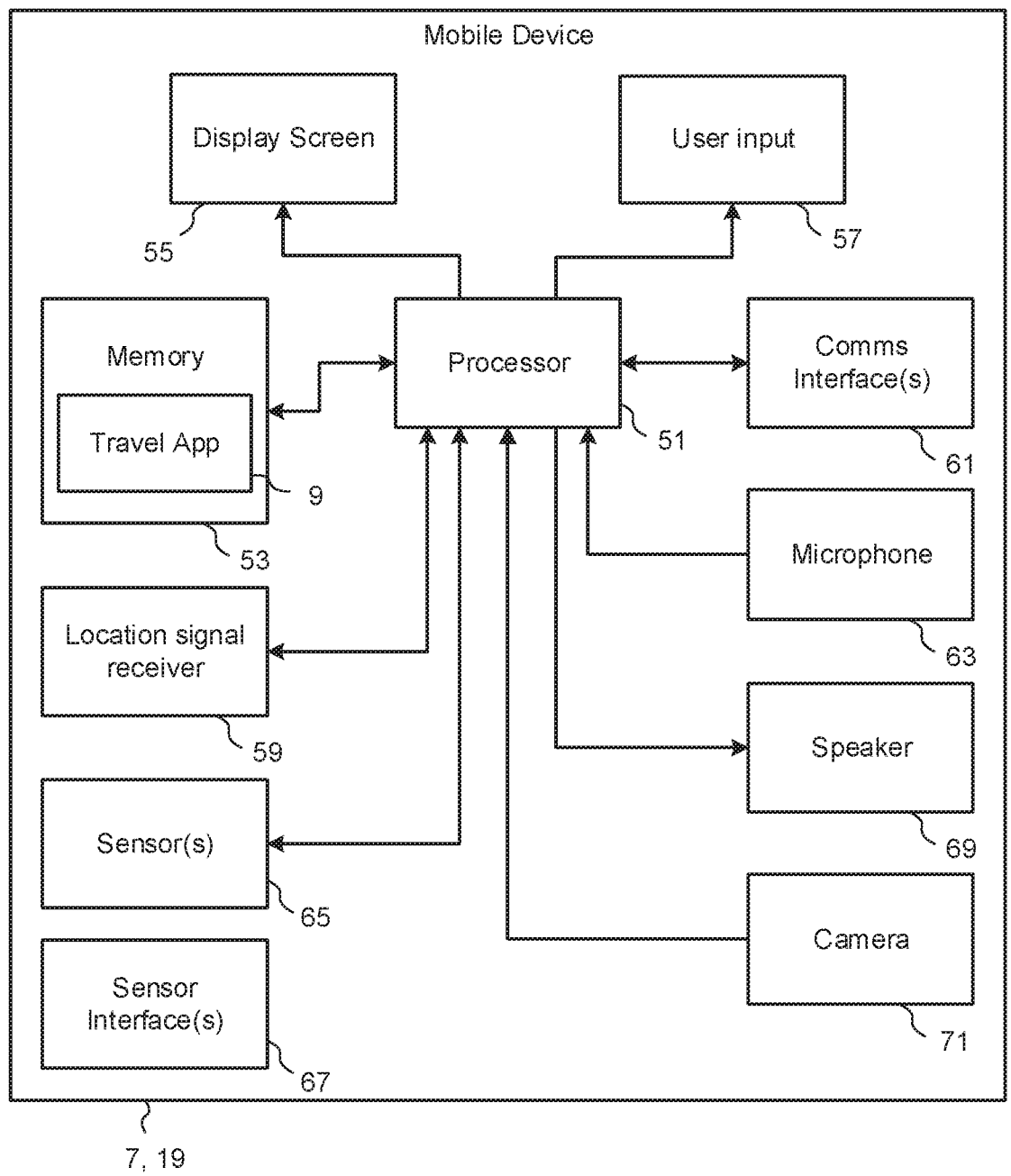
FIG. 3 is a block diagram of a mobile device for use in the embodiments of the invention.

The mobile device 7,19 may be a smartphone, tablet, PDA (Personal Digital Assistant), or a wearable device such as a smart watch, an electronic wristband, or Google Glass™, etc. FIG. 3 is a schematic diagram of one such exemplary mobile device 7,19, having a processor 51, memory 53, a display screen 55, user input module 57, a location signal receiver 59 and communications interface(s) 61. The location signal receiver 59 may be a GPS based receiver for determining a geolocation of the mobile device 7,19. The mobile device 7,19 may also include one or more of: a microphone 63, one or more sensors 65, one or more sensor interfaces 67 that connect the mobile device 7, 19 to respective sensors 11, a speaker 69 and a camera 71. The travel app 9 and crew app 21 may be downloaded and installed to the memory 53 of the mobile device 7,19, and may require registration of the user with the server 3 via the app, or secure log-in to the app by an existing registered user with the server 3.

The server 3 may also be connected to a mobile data network (not shown), for communication with the mobile devices 7,19. However, in practice, the mobile devices 7,19 are typically required to be placed in "flight mode" when the passenger and crew are on board the aircraft, and data communication during a flight may be restricted to connections via the in-cabin network(s) 9.

Figure 4:
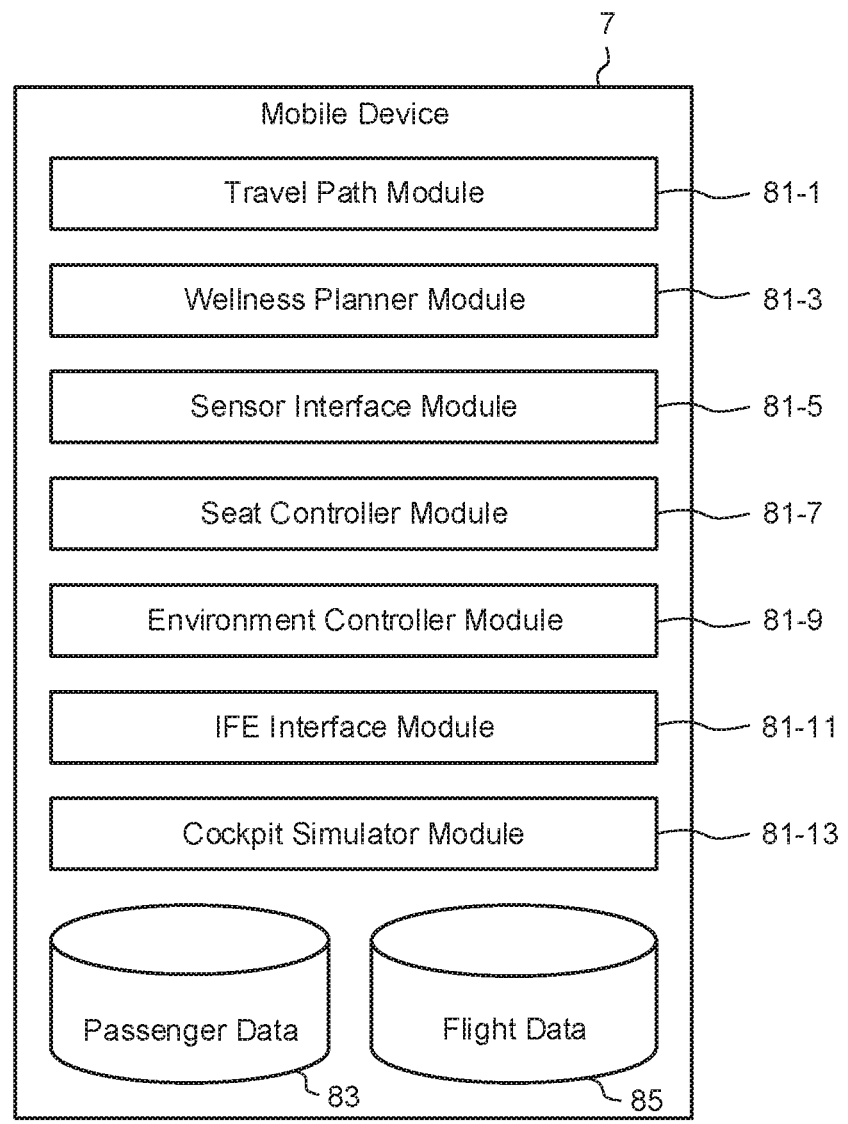
FIG. 4 is a block diagram illustrating the processing modules of the mobile device of FIG. 3 according to an embodiment of the invention.

FIG. 4 is a block diagram illustrating processing modules 81 of the passenger's mobile device 7 in the present embodiment. The passenger's mobile device 7 stores a local copy of the passenger's customer data 83 and flight data 85 that can be retrieved and processed by the processing modules 81. One or more of the processing modules 81 may be provided as integrated components of the passenger's travel app 9, or may be provided as separate mobile applications linked to the travel app 9. Additionally or alternatively, one or more of the processing modules 81 may be configured to receive data from respective modules in the server 3 for output by the passenger's travel app 9.

In this embodiment, the passenger's mobile device 7 includes a travel path module 81-1 for generating a travel path for a passenger having a booked and/or purchased journey, including various booked entities such as an outbound flight from the passenger's home location to a destination location, a hotel reservation at the destination location, a return flight, etc. The travel path for the passenger's booked journey may be an end-to-end plan, consisting of a plurality of journey segments from a departure point, such as the passenger's home location, to a destination point, such as a boarding gate in the departure airport terminal assigned to the passenger's flight or the location of a hotel booked in the destination city. The travel path module 81-1 processes the customer and flight data 23,25 to identify and determine the journey segments, as well as associated timing parameters, such as anticipated start time, duration, etc. The travel path module 81-1 can also determine and schedule predefined events associated with the journey segments, that together define the timeline of scheduled events for the travel path. The travel path module 81-1 can also dynamically revise and update the travel path and event timeline based on the monitored geographical location of the customer together with environmental information retrieved from a plurality of data sources, for example to take into account identified disruptions to the travel path.

The travel path module 81-1 may generate data for a graphical user interface (GUI) representation of the travel path. The generated travel path data may define an interactive graphical representation of the travel path to be displayed by the travel app 9.

The passenger's mobile device 7 also includes a wellness planner module 81-3 for determining and scheduling events associated with the journey segments, based on a predefined set of rules that combine the customer data, flight data and sensor data to create a personalised travel experience for the passenger. As will be described in more detail below, the wellness planning module 81-3 can also schedule predefined events associated with respective journey segments, based on factors such as passenger preferences, travel itinerary, passenger current physical state, etc. For example, the wellness planner module 81-3 can determine a sequence of events and associated scheduling information to assist a passenger with overcoming the effects of jet lag at the destination. The predefined events may include sleep, wake, stretch, exercise, eat, drink, stay awake, engage in-flight entertainment, etc. The predefined events may be determined for a plurality of journey segments, such as a segment of time before the scheduled flight, a segment of time in-flight, and a segment of time after arrival at the destination. Post-flight events may also be scheduled, such as treatment bookings.

The wellness planner module 81-3 can also dynamically adjust and/or reschedule the events, such as the event order, start time, end time, duration, in response to received sensor input data. For example, the wellness planning module 81-3 can schedule in-flight events relating to optimal sleeping, eating and exercise patterns to assist with alleviating the passenger's jet lag at the destination. The wellness planning module 81-3 can dynamically adjust the events in response to received passenger and environment data from the sensors indicating, for example, that the passenger is awake, asleep, hungry, nervous, hot, cold, uncomfortable, etc.

As another example, the wellness planner module 81-3 can determine a sequence of events and associated scheduling information to assist a passenger with a personalized and more comfortable in-flight experience. The predefined events may include sleep suggestion, wake-up alarm, personalised sound/audio file output, in-flight exercise programme. The scheduled events can also include automated commands and/or instructions to external controllers and output devices. For example, the control system 87 can output:

cabin crew instructions to the crew mobile device 19 via the mobile device interface module 55, such as service instructions to provide water when the passenger is determined to be dehydrated, to offer a blanket when the detected temperature is determined to be below a predefined and/or preferred threshold, or not to disturb or wake up for a scheduled meal based on the determined sleep phase of the passenger, etc.

local temperature control signals to the environment controller via an environment controller interface module 81-9, and seat control signals to the seat controller via a seat controller interface module 81-7.

The wellness planner module 81-3 can also directly control aspects of the passenger's local environment defined by the scheduled events, such as one or more properties of the passenger seat 31 via a seat controller module 81-7 in communication with the seat controller 13 over the in-cabin network 5, and one or more properties of the environment around the passenger via an environment controller module 81-9 in communication with the environment controller 15 over the in-cabin network 5. Alternatively, the seat controller module 81-7 and the environment controller module 81-9 may be configured to communicate control instructions to the seat controller 13 and the environment controller 15, respectively, via the server 3. Optionally, the mobile device 7 can include a module to enable the passenger to control, via direct user input, properties of the passenger seat 31 and/or the environment.

The passenger's mobile device 7 can also include an IFE interface module 81-11 for communicating data with the IFE 17 over the in-cabin network 5. In another embodiment, the passenger's mobile device 7 can include a cockpit simulator module 81-13 for displaying an interactive cockpit simulator via the passenger's mobile device 7, for example based on input data from sensors located about the aircraft and non-sensitive information received from the aircraft's cockpit system(s).

Figure 5:
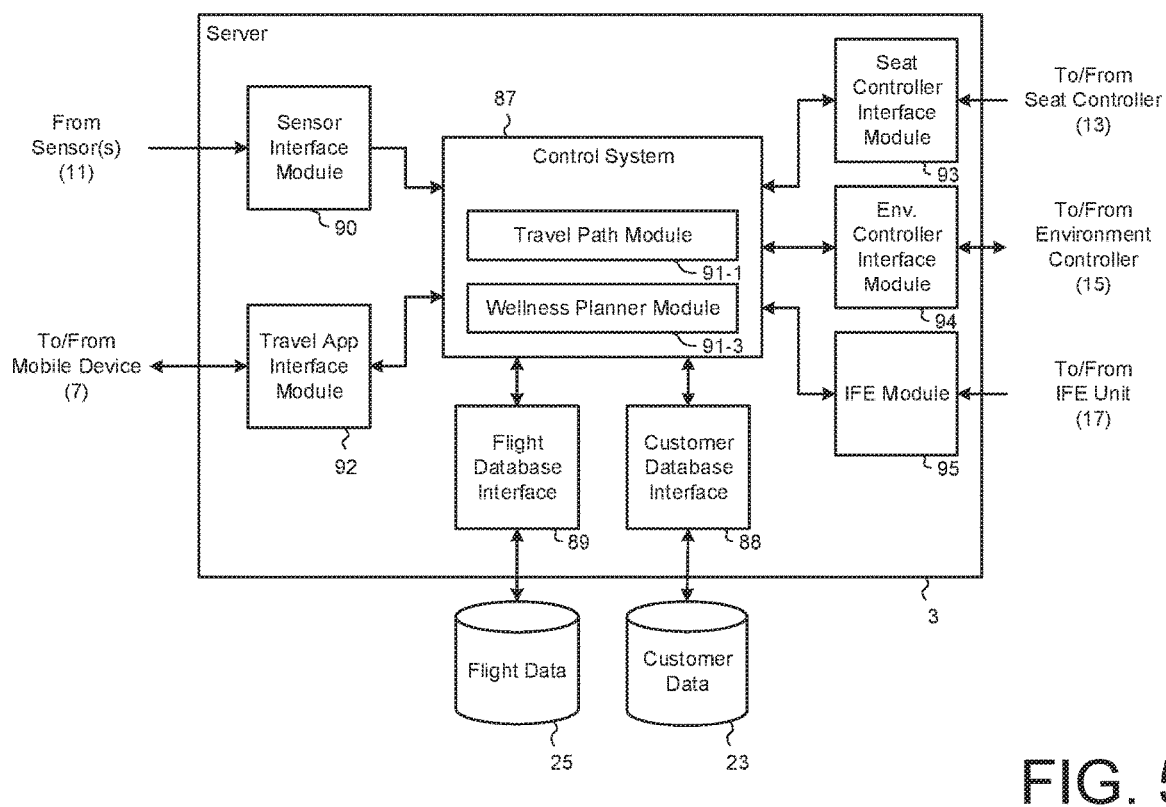
FIG. 5 is a block diagram of a server according to an alternative embodiment of the invention.

FIG. 5 is a block diagram of the server 3, illustrating the processing modules of the server 3 in an alternative embodiment. In this embodiment, the server 3 includes a control system 87 that retrieves customer data 23 and flight data 25 for a plurality of registered users via respective database interfaces 88,89, and receives sensor data from sensors 11 via a sensor interface module 90. The control system 87 includes a travel path module 91-1 for determining travel paths and associated scheduled events for the plurality of passengers, based on the retrieved customer and flight data 23,25 and the received sensor data, and for determining and scheduling predefined events associated with the journey segments. The control system 87 also includes a wellness planner module 91-3 for processing the data based on specific requirements of the respective passengers and scheduling predefined events for the respective passenger's optimal wellbeing, and for automatically controlling the respective passenger's local in-flight environment according to the scheduled events.

The travel path module 91-1 of the control system 87 can generate data for the interactive GUI representation of the travel path, for example based on scheduling data determined by the wellness planner module 91-3. The generated travel path data is communicated to the travel app 9 on the passenger's mobile device 7, via a travel app interface module 92. The control system 87 can also output control signals associated with scheduled event actions to the seat controller 13 via a seat controller interface 93, to the environment controller 15 via an environment controller interface module 94, and to the IFE unit 17 via an IFE module 95. Feedback data and control signals may also be received from the seat controller 13, environment controller 15 and IFE unit 17 via the respective modules.

Additionally, the travel app interface module 92 can receive and process data in response to user input via the travel app 9, for example, to search for and retrieve flight data 25, retrieve and/or update customer data 23, book or purchase a new flight, re-book a flight at a new time and/or date, etc. Alternatively, the generated travel path data may define user-selectable elements of the travel path, associated with the scheduled events for example, for display by the travel app 9 based on one or more predefined travel path GUI templates. As yet a further alternative, the generated travel path data may consist of scheduling data elements in a structured data format, such as XML, CSV, etc.

Wellness Planning and Environment Control

Figure 6A:
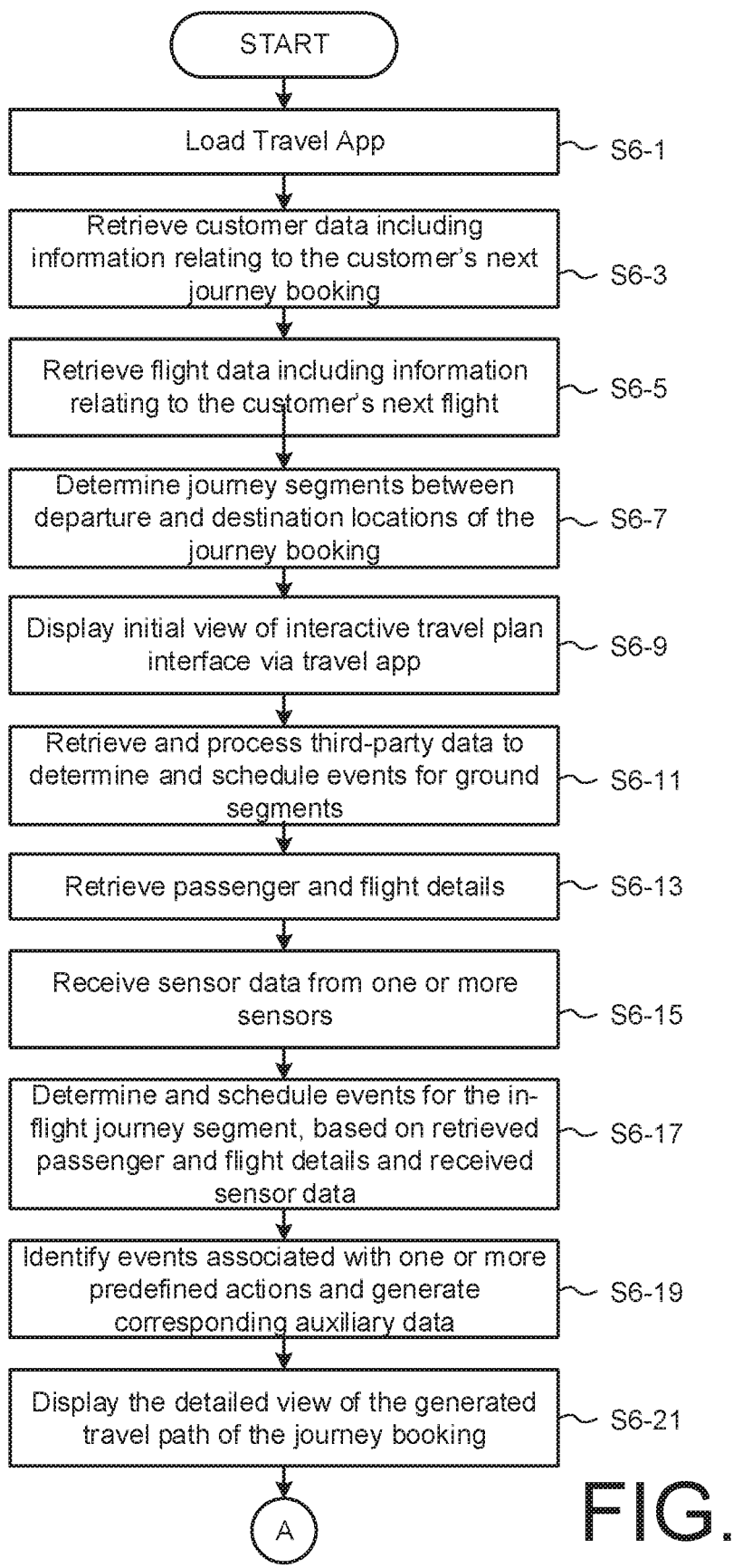
FIGS. 6A and 6B, is a flow diagram illustrating processing steps performed by the mobile device of FIG. 4 according to an embodiment.
Figure 6B:
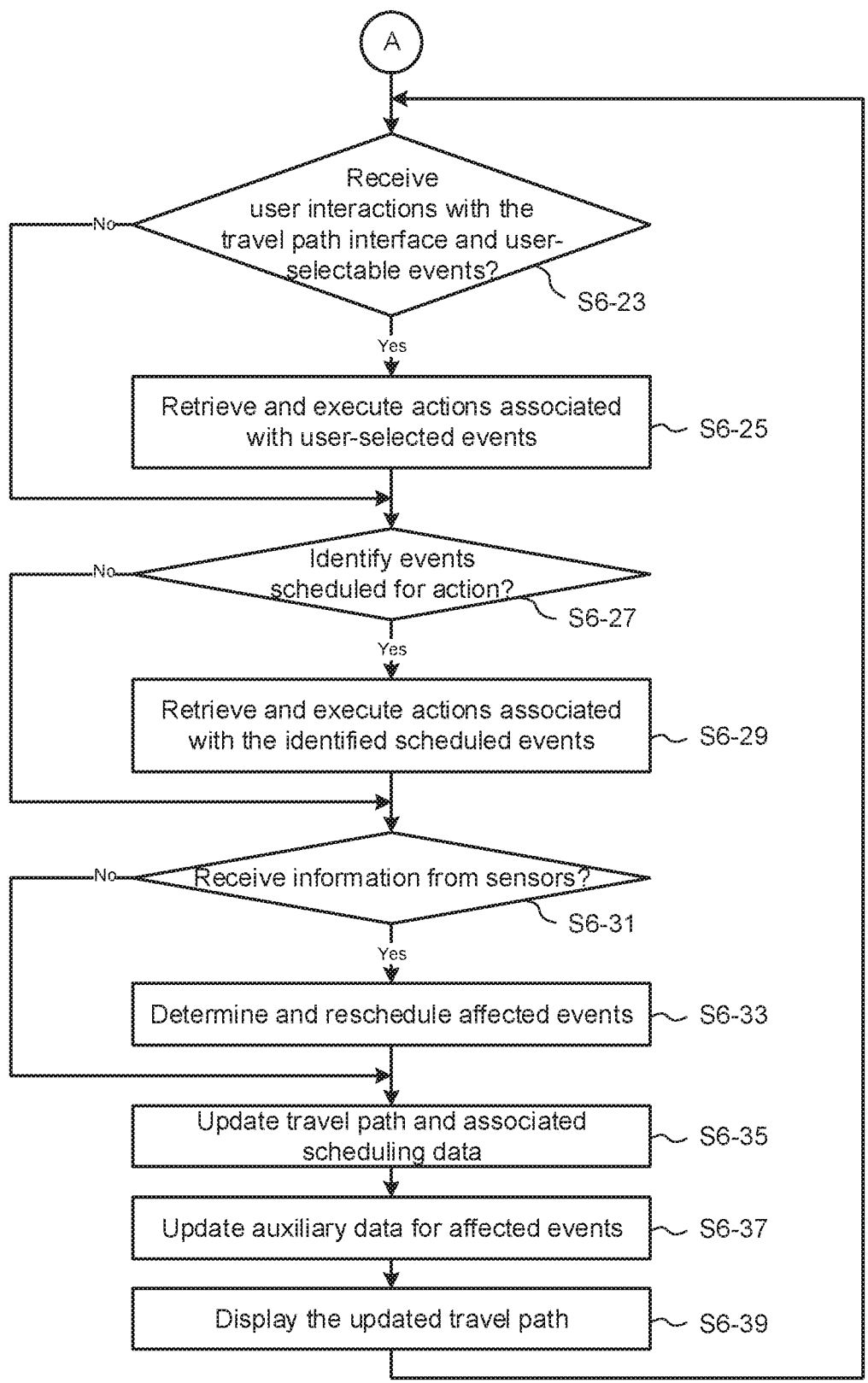
Figure 7:
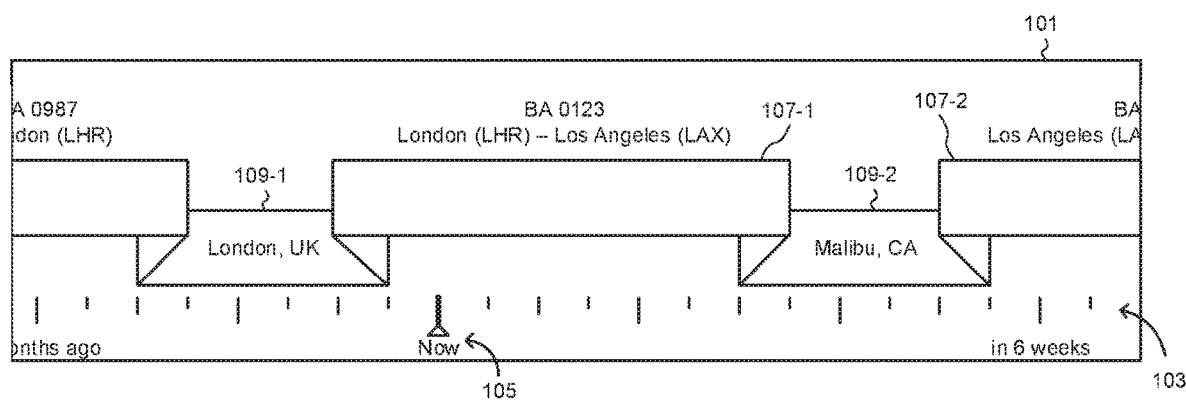
FIG. 7 schematically illustrates an example of an initial view of an interactive travel path displayed by the mobile device.

A description has been given above of the components forming part of the travel environment system 1 in one embodiment. A detailed description of the operation of these components will now be given with reference to the flow diagram of FIG. 6, which comprises FIGS. 6A and 6B, for an example computer-implemented wellness planning and environment control process using the passenger's mobile device 7. Reference is also made to FIGS. 7 and 8, schematically illustrating exemplary dynamic travel paths displayed by the travel app 9 on the passenger's mobile device 7.

As shown in FIG. 6, the process begins at step S6-1 where the passenger's mobile device 7 loads the travel app 9, for example in response to a user command to launch the app. The travel app 9 may require the customer to login with pre-registered details. At step S6-3, the travel path module 81-1 on the mobile device 7 retrieves customer data 23 for the customer registered with the travel app 9, for example in response to a user command to display an interactive travel plan interface via the travel app 9. The retrieved customer data 23 includes information relating to the passenger's next booked journey, such as details of the outbound and return flights that are booked for the journey.

In this embodiment, the mobile device 7 is configured to plan and generate a travel path for the passenger's booked journey that can be displayed in an interactive travel path interface of the travel app 9. Accordingly, at step S6-5 in FIG. 6, the travel path module 81-1 retrieves flight data 25 including information relating to the passenger's next flight in the retrieved booked journey. The travel path module 81-1 may also retrieve data from additional sources, such as terminal information relating to the departure and arrival airport terminals of the passenger's next flight. At step S6-7, the travel path module 81-1 processes the retrieved data and determines a plurality of journey segments for the booked journey. For example, a booked journey between departure and destination locations can be processed into a plurality of high level journey segments, based on information relating to the outbound and return flights, such as time and date, flight number, carrier, airport, etc. At step S6-9, the travel app 9 displays an initial view of the interactive travel plan, including the retrieved information relating to the passenger's next booked journey.

FIG. 7 schematically illustrates one example of an initial view of the interactive travel path displayed by the travel app 9 on the passenger's mobile device 7. The high level segments of this initial view include a plurality of in-flight segments 107 corresponding to discrete time periods when the customer is on-board a respective booked flight, and intervening ground segments 109 corresponding to discrete time periods between booked flights. In this example, the travel path is presented as a scrollable ribbon interface 101, with a horizontal dynamic time axis 103 indicating the location along the ribbon corresponding to the current time 105. The ribbon interface 101 may instead be displayed in a vertical orientation. In this example, the customer data 23 includes information relating to a booked journey to Malibu, Calif., with an outbound flight departing today from London's Heathrow Airport and arriving at Los Angeles International Airport, displayed as a first raised segment 107-1 of the ribbon interface 101. The customer data 23 also includes information relating to the return flight in six weeks time, displayed as a second raised segment 107-2, with a corresponding indication on the time axis 103.

Figure 8A:
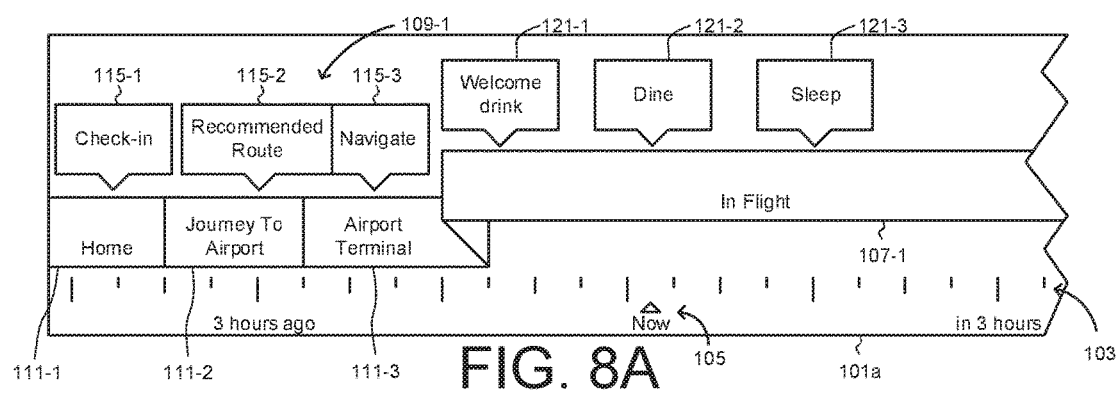
FIG. 8, which comprises FIGS. 8A and 8B, schematically illustrates an example of a detailed view of the interactive travel path in FIG. 7.
Figure 8B:
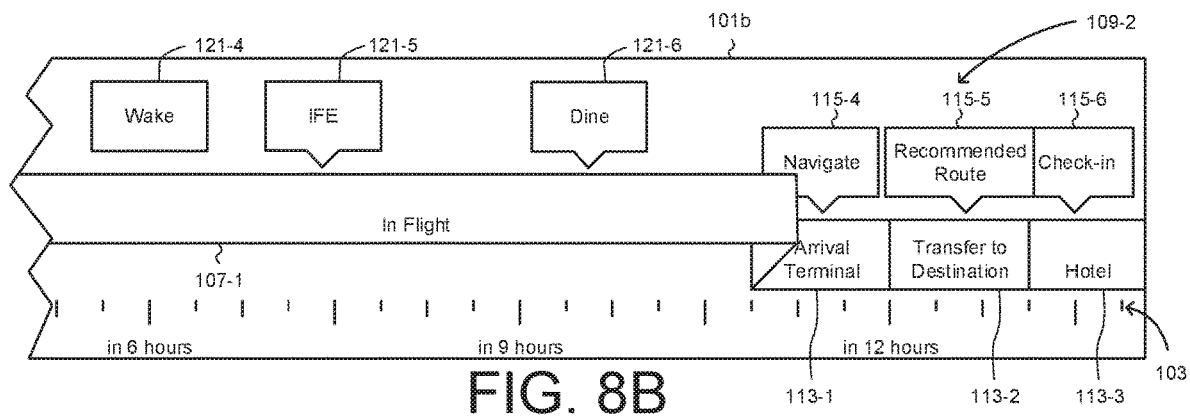

The booked journey may also include details of a hotel reservation while the customer is at the destination, displayed as a lower segment 109-2 between the respective raised segments 107-1, 107-2. Similarly, a lower segment 109-1 precedes the raised segment 107-1 associated with the outbound flight, indicating that the customer was at a predefined home location, London, UK in this example. In this embodiment, the raised segments 107 correspond to in-flight segments of the passenger's booked journey and the lower segments 109 correspond to ground segments of the journey. The user can scroll the ribbon interface 101 along the horizontal axis, for example via user input, to view the passenger's past and future booked journeys. As described later, each raised segment 107 of the ribbon interface 101 may be a user-selectable element of the interface in order to retrieve and view more data relating to the associated flight. Alternatively or additionally, the ribbon interface 101 may be configured to process user input commands to zoom into the travel path at a selected position to retrieve and view more data relating to the segment 107,109 at that position, and to zoom out to return to the previous or initial view. Following from the example illustrated in FIG. 7, The travel path module 81-1 can also processes each high level journey segment to determine a respective plurality of lower level journey segments, and to identify one or more defined and/or anticipated geographical locations associated with each lower level journey segment. FIG. 8, which consists of FIGS. 8A and 8B, schematically illustrates an example of a zoomed-in view of the interactive travel path displayed by the travel app 9. In this example, a first high level ground segment 109-1, prior to the passenger's outbound flight segment 107-1 from London to Los Angeles, is broken down into three discrete and sequential lower level segments 111, as illustrated in the first portion 101a of the ribbon interface in FIG. 8A. The first lower level segment 111-1 is associated with a discrete time period of the travel path when the customer is at a predefined home location, for example the passenger's home city or home address. The second lower level segment 111-2 is associated with the subsequent time period of the travel path when the customer is, or should be, travelling to the departure airport terminal. The third lower level segment 111-3 is associated with the subsequent time period of the travel path when the customer is in the airport terminal.

Similarly, the high level ground segment 109-2 after the passenger's outbound flight segment 107-1 from London to Los Angeles is also broken down into three lower level segments 113, as illustrated in the second portion 101b of the ribbon interface in FIG. 8B. However, in this ground segment, the first lower level segment 113-1 is associated with the time period of the travel path when the customer is in the destination airport terminal, the second lower level segment 113-2 is associated with the subsequent time period when the customer will be travelling to the hotel in the destination city, and the third lower level segment 113-3 is associated with the subsequent time period when the customer The travel path module 81-1 can also determine one or more events for respective journey segments. Each event is also associated with a time or time period along the time axis 103, which may be calculated relative to the current time 105, based on the retrieved data. For example, as illustrated in FIG. 8, which comprises FIGS. 8A and 8B, the in-flight segment 107-1 includes a sequence of predefined events 121 that are scheduled at respective times during the flight, such as a welcome drink event 121-1 shortly after boarding or take-off, a first dining event 121-2, a sleep event 121-3, a wake event 121-4, an IFE event 121-5 after the passenger has woken up, and a second dining event 121-6.

Events 115 can also be determined for the ground segments 109. For example, the first lower level segment 111-1 of the first ground segment 109-1 includes an event 115-1 associated with an earliest possible and/or recommended time for the customer to proceed with online check-in for the outbound flight. The second lower level segment 111-2 of the first ground segment 109-1 includes an event 115-2 associated with a recommended route to the departure airport terminal, for example as determined by the travel path module 81-1 or by the travel app 9 based on the passenger's current geo-location. The third lower level segment 111-3 of the first ground segment 109-1 includes one or more events 115-3 associated with respective navigation stages that the customer must progress through the departure airport terminal, such as bag drop, passport control and security, before arriving at the departure gate assigned to the outbound flight.

Similarly, a plurality of events 115 are determined for the second ground segment 109-2. The first lower level segment 113-1 of the second ground segment 109-2 includes one or more events 115-4 associated with respective stages that the customer must progress through the arrival airport terminal, such as the arrival gate assigned to the flight, passport control and the baggage reclaim belt or area assigned to the flight. The second lower level segment 113-2 of the second ground segment 109-2 includes an event 115-5 associated with a recommended route from the arrival airport terminal to the hotel at the destination. The third lower level segment 113-3 of the second ground segment 109-2 includes an event 115-6 associated with an anticipated time of check-in at the hotel, for example as calculated by the travel path module 81-1.

Accordingly, referring back to FIG. 6, at step S6-11 the travel path module 81-1 can retrieve data from one or more third-party data sources, such as traffic, public transport, weather and airport terminal data, and process the retrieved data to determine and schedule the plurality of predefined events for the ground segments 109 of the passenger's journey. The determination of events that can be scheduled for the passenger's journey may depend on the availability of data from the third-party data sources for the geographical locations along the travel path.

At step S6-13, the wellness planner module 81-3 retrieves passenger and flight details from customer data 83 and flight data 85, such as information relating to the passenger's registered details and personal preferences, travel itinerary, meal schedule, cabin lighting schedule, etc. At step S6-15, the wellness planner module 81-3 receives sensor data from one or more sensors 11 via the sensor interface module 81-5. The received sensor data will vary depending on the availability of sensors associated with the passenger and/or passenger's local environment. At step S6-17, the wellness planner module 81-3 determines and schedules one or more predefined events for the in-flight journey segment 107-1, based on the retrieved passenger details from customer data 83, flight details from flight data 85, and the received sensor data.

At step S6-19, the wellness planner module 81-3 identifies events that are associated with one or more predefined actions, and generates auxiliary data for the identified events that can be displayed or transmitted by the travel app 9 in response to a user command to select the respective event 115,121 from the ribbon interface 101*a*. For example, auxiliary data can be generated for the sleep event 121-3 illustrated in FIG. 8A, defining control instructions that are transmitted to the seat controller 13 to recline the seat to a sleeping position, as well as control instructions that are transmitted to the environment controller 15 to dim the lights, in response to user input selection of the event 121-3 from the interactive display. As another example, auxiliary data can be generated to suggest and guide the passenger through one or more exercise routines, based on sensor input feedback relating to the passenger's body movements and heart rate.

Table 1 sets out a number of exemplary data and sensor input parameters that may be processed by the wellness planner module 81-3 to determine and schedule one or more respective event outputs. It will be appreciated that many other combinations of predefined data inputs, environment sensor data inputs, and changeable passenger sensor data inputs due to physiological states, can be used to determine and trigger system responses and events.

TABLE 1

| Predefined Data Input(s) | Environment Sensor Input(s) | Passenger Sensor Input(s) | Event Output(s) |
| --- | --- | --- | --- |
| Biometric data, travel itinerary, personal preferences | | Body movements, heart rate | Sleep/wake event, seat control, lighting control |
| Biometric data, personal preferences | | Body movements | Seat control |
| Biometric data, meal schedule | Cabin lighting, Ambient noise, local temperature | Body movements, heart rate | Wake suggestion event, seat control, lighting control |
| Biometric data, meal schedule | Local temperature | Body movements, heart rate | Drink/Meal suggestion event, cabin crew instructions |
| Biometric data, personal preferences | Local temperature, humidity, cabin pressure | | Air conditioning control |
| Biometric data, travel itinerary, personal preferences | Air pressure, Altitude | Body movements, heart rate | Exercise suggestion/routine event |
| Biometric data, travel itinerary, personal preferences | Ambient temperature | Body temperature, stomach acidity | Post-flight treatment booking, sleep/meal management suggestion events |

For example, a passenger's mobile device 7, such as a smart watch with a temperature sensor, may transmit data identifying the passenger's recorded body temperature to a processing node, such as the server 3 or a cabin crew's mobile device 19, via the in-flight network 5. The processing node may then determine a temperature adjustment for that passenger based on the received temperature data, and in response, transmit control instructions to the cabin environment controller 15 to effect a change of environment temperature automatically. Alternatively, the crew app 21 on the crew mobile device 19 may prompt the cabin crew to manually adjust the temperature controls based on the calculated needs of passenger. The processing node may instead, or additionally, be configured to receive temperature data generated from a plurality of passenger devices and sensors located in a particular cabin, along with input data from the associated passengers indicative of a vote on the desired cabin temperature, and to determine environment temperature adjustments based on the group of passenger votes. The passenger may also be informed of the changes to the travel environment and an aggregate body temperate, for example via data received and displayed by their associated mobile device 7 and/or the IFE unit 17.

As another example, the passenger's mobile device 7 is monitoring his or her biorhythms, and the system 1 may use data received from the passenger's mobile device 7 to detect or determine when the passenger is about to sleep or wake, and in response, to send control instructions to adjust the lighting around the passenger, as well as inform a crew member to prepare a beverage service for when the passenger awakes or not to disturb the passenger when asleep. Additionally, the system 1 may be configured to detect the passenger's emotional and physical state, and in response, determine event output(s) and indicate to the cabin crew to attend to a nervous or stressed passenger's needs appropriately.

As those skilled in the art will appreciate, the system may be further configured to retrieve and process historical data associated with the passenger, travel environment, and/or journey. For example, the server can be configured to retrieve recorded sensor and/or user input data that has been previously collected, outside of the travel environment, and stored on the passenger's mobile device or accessible from a remote server via an API. The received historical data may then used along with sensor data collected within the travel environment to make an optimal decision of one or more changes to the environment based on the passenger's detected or determined wellness. For example, historical data associated with the passenger, such as previous geo-locations and health data collected by the passenger's mobile device over a period of time, may be retrieved and processed by the server, together with received real-time sensor inputs, in order to determine or modify a personalised programme or event schedule to aid with combating travel fatigue.

The travel path module 81-1 can also be configured to generate auxiliary data for events associated with the ground segments 109, such as information relating to specific navigation, routing and timing, for example to and within the airport terminal. As yet another example, auxiliary data may include a link to a website or an external mobile app, such as a flight online check-in website, a hotel website or app with information relating to the hotel reservation, a public transport website or app with additional route, time and map information, a dedicated map website or app, etc.

At step S6-21, the travel app 9 displays the detailed view of the generated travel path for the current journey in the interactive user interface, including the user-selectable events 115,121 associated with the journey segments 111, 113 of the travel path. At step S6-23, the travel app 9 receives and processes user interactions with the travel path interface 101 and user-selectable events 115,121 of the interface, for example to handle user commands to scroll and/or zoom the displayed portion of the travel path, and in response, retrieves and executes the one or more actions associated with a user selected event 115,121, at step S6-25 as necessary. At step S6-27, the travel app 9 also monitors the scheduled events 115,121 to identify events that are scheduled for action at the current time, and automatically retrieves and executes the one or more actions associated with any identified scheduled event 115,121, at step S6-29 as necessary.

In this embodiment, the system is also configured to dynamically adjust the travel path and scheduled events in response to received sensor data. For example, the wellness planner module 81-3 can receive, at step S6-31, information from sensors 11 relating to an increased heart rate, indicative of the passenger waking up from a sleep cycle before the scheduled wake event. In response, the wellness planner module 81-3 determines and reschedules one or more affected events 121 for the in-flight segment 107 of the passenger's booked journey, at step S6-33 as necessary. Following from the example of the passenger waking up early, the affected events 121 can include the wake event 121-4 and the IFE event 121-5 that are brought forward along the timeline, by adjustment of the respective timing parameters. In this way, the passenger can be prompted to accept the wake event 121-4, and in response, the system can automatically adjust the passenger's seat 31, lighting 43 and air-conditioning 45 based on the passenger's preferences. Additionally, the wellness planner module 81-3 can determine one or more new events 121 to be inserted into the event timeline, such as suggested refreshments that can be ordered by the passenger and automatically transmitted to the crew app 21.

At step S6-35, the wellness planner module 81-3 updates the travel path and associated scheduling data based on the identified and rescheduled events 121. At step S6-37, the wellness planner module 81-3 generates or updates auxiliary data for any new and affected events, for example including options for the passenger to override the automatically rescheduled event. At step S6-39, the travel app 9 displays the updated travel path and the process returns to step S6-23 where the travel app 9 continues to monitor and respond to user interactions, sensor inputs and/or further scheduled events.

Computer System

Figure 9:
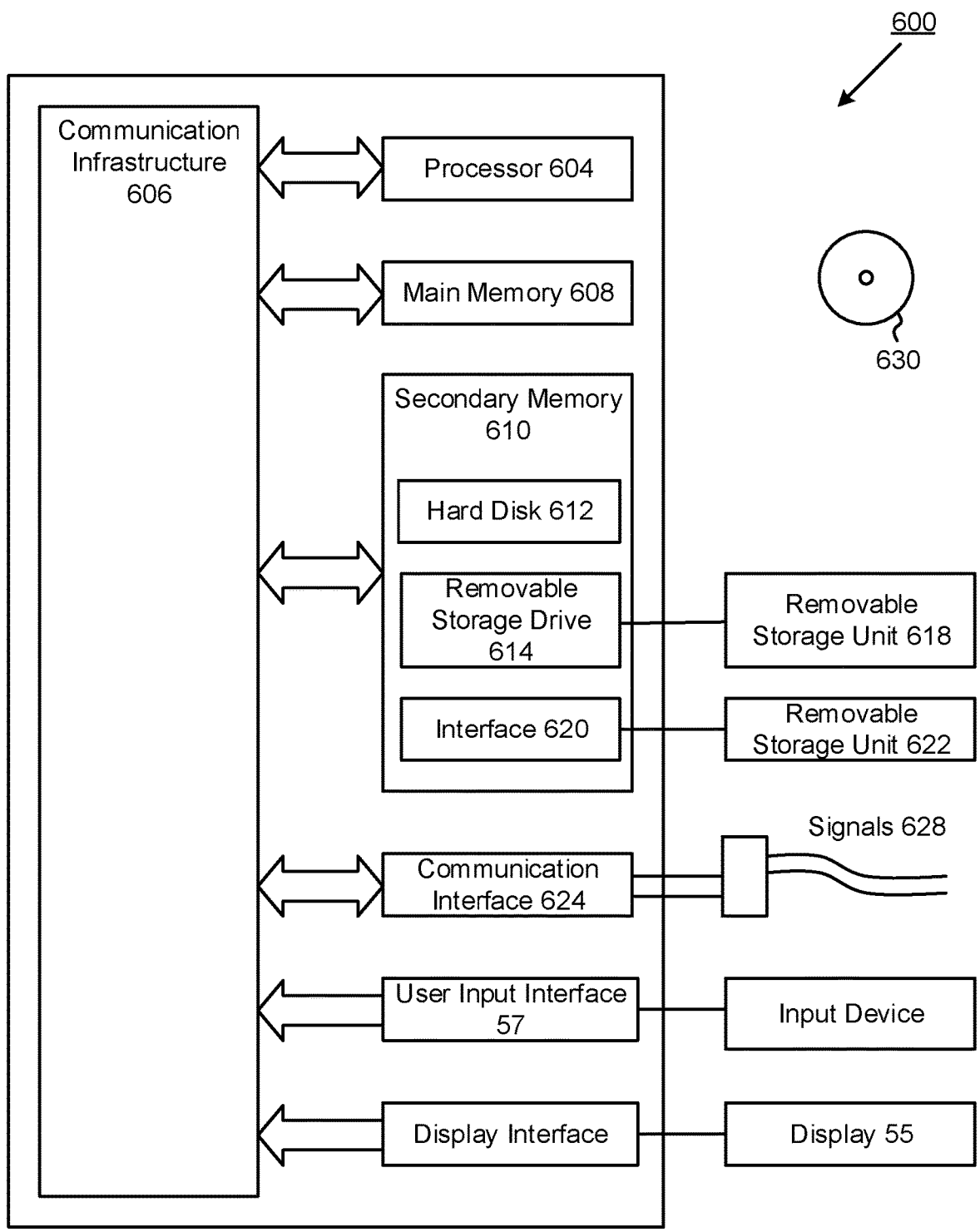
FIG. 9 is a diagram of an example of a computer system for use in embodiments of the invention.

The system described herein may comprise a computer system 600 as shown in FIG. 9. Embodiments of the present invention may be implemented as programmable code for execution by the computer system 600. Various embodiments of the invention are described in terms of this example computer system 600. After reading this description, it will become apparent to a person skilled in the art how to implement the invention using other computer systems and/or computer architectures.

Computer system 600 includes one or more processors, such as processor 604. Processor 604 may be any type of processor, including but not limited to a special purpose or a general-purpose digital signal processor. Processor 604 is connected to a communication infrastructure 606 (for example, a bus or network). Computer system 600 also includes a main memory 608, preferably random access memory (RAM), and may also include a secondary memory 610. Secondary memory 610 may include, for example, a hard disk drive 612 and/or a removable storage drive 614, representing a floppy disk drive, a magnetic tape drive, an optical disk drive, etc. Removable storage drive 614 reads from and/or writes to a removable storage unit 618 in a well-known manner. Removable storage unit 618 represents a floppy disk, magnetic tape, optical disk, etc., which is read by and written to by removable storage drive 614. As will be appreciated, removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that previously found in video game devices), a removable memory chip (such as an EPROM, or PROM, or flash memory) and associated socket, and other removable storage units 622 and interfaces 620 which allow software and data to be transferred from removable storage unit 622 to computer system 600. Alternatively, the program may be executed and/or the data accessed from the removable storage unit 622, using the processor 604 of the computer system 600.

Computer system 600 may also include a communication interface 624. Communication interface 624 allows software and data to be transferred between computer system 600 and external devices. Examples of communication interface 624 may include a modem, a network interface (such as an Ethernet card), a communication port, a Personal Computer Memory Card International Association (PCMCIA) slot and card, etc. Software and data transferred via communication interface 624 are in the form of signals 628, which may be electronic, electromagnetic, optical, or other signals capable of being received by communication interface 624. These signals 628 are provided to communication interface 624 via a communication path. A communication path carries signals 628 and may be implemented using wire or cable, fibre optics, a phone line, a wireless link, a cellular phone link, a radio frequency link, or any other suitable communication channel. For instance, the communication path may be implemented using a combination of channels.

The terms "computer program medium" and "computer usable medium" are used generally to refer to media such as removable storage drive 614, a hard disk installed in hard disk drive 612, and signals 628. These computer program products are means for providing software to computer system 600. However, these terms may also include signals (such as electrical, optical or electromagnetic signals) that embody the computer program disclosed herein.

Computer programs (also called computer control logic) are stored in main memory 608 and/or secondary memory 610. Computer programs may also be received via communication interface 624. Such computer programs, when executed, enable computer system 600 to implement the present invention as discussed herein. Accordingly, such computer programs represent controllers of computer system 600. Where the invention is implemented using software, the software may be stored in a computer program product 630 and loaded into computer system 600 using removable storage drive 614, hard disk drive 612, or communication interface 624, to provide some examples.

In alternative embodiments, the invention can be implemented as control logic in hardware, firmware, or software or any combination thereof. The apparatus may be implemented by dedicated hardware, such as one or more application-specific integrated circuits (ASICs) or appropriately connected discrete logic gates. A suitable hardware description language can be used to implement the method described herein with dedicated hardware.

Alternative Embodiments

The embodiments described above are illustrative of rather than limiting to the present invention. Alternative embodiments apparent on reading the above description may nevertheless fall within the scope of the invention.

For example, in the embodiment described above, the server determines the travel path and associated scheduling data for display by the travel app. It will be appreciated that in an alternative embodiment, some of the processing steps performed by the travel path generator module and/or the planning sub-module in the above embodiment can instead or additionally be performed by the processing modules of the passenger's travel app. For example, the dynamic travel path module on the mobile device can be configured to generate data identifying the sequence of journey segments and associated events and to determine scheduling information relating to estimations of timing and duration. In this alternative, the mobile device would not need to communicate with the server in order to monitor the passenger and environment input data, dynamically adjust the travel path, and/or control the local environment. As yet a further alternative, the server may not include a travel path module and wellness planner module.

In the embodiment described above, the travel path is displayed by the travel app on the passenger's mobile device. In an alternative embodiment, the travel path and scheduling data may be automatically transmitted to the passenger's IFE unit.

In the embodiment described above, a server is configured to determine travel paths and associated scheduled events for the plurality of passengers, based on retrieved customer and travel data and the received sensor data, and to determine, schedule and control predefined events associated with the journey segments. As those skilled in the art will appreciate, one or more nodes of the in-cabin network may instead be configured to carry out the functionalities described in the above embodiment for dynamic travel event scheduling based on determined passenger wellness. For example, the cabin crew mobile devices may be configured as distributed, or peer-to-peer (P2P), computing nodes that communicate and coordinate actions by passing data messages over the in-cabin network. The cabin crew mobile devices may receive environment and passenger sensor input data from sensors and device nodes on the network, and transmit control instructions to seat and environment controller nodes on the network.

The invention claimed is:

1. A system for dynamic travel event scheduling, comprising one or more processors configured to:
   retrieve stored data including information relating to a passenger's itinerary, the itinerary including at least one scheduled journey;
   generate data defining a dynamic event schedule based on the retrieved data, the dynamic event schedule including at least a sleep event, a wake event, and a post-wake event, each associated with a respective timing parameter, and wherein said wake and post-wake events are each associated with at least one trigger sensor input and at least one action output; and
   during the at least one scheduled journey:
      receive one or more sensor inputs providing information on the physiological state of the passenger and/or environmental conditions in the vicinity of the passenger;
      determine, in response to the received one or more sensor inputs, one or more affected wake and post-wake events included in the dynamic event schedule that are associated with a corresponding trigger sensor input; and
      in response to said determining of said one or more affected events, adjusting respective timing parameters of the one or more affected events, and cause the one or more action outputs of an affected event to control the passenger's travel environment.

2. The system of claim 1, wherein the outputs to control the passenger's travel environment comprises one or more of signals to: control one or more properties of a passenger seat, and control lighting and/or air conditioning above and/or around the passenger's seat.

3. The system of claim 2, wherein the at least one post-wake event is selected from a set of predefined events including: stretch, exercise, eat, drink, stay awake, and engage in-flight entertainment.

4. The system of claim 1, wherein the sleep and wake events are associated with respective action outputs to automatically control a recline position of the passenger's seat and a lighting level above or around the passenger's seat.

5. The system of claim 1, wherein the retrieved data further includes information relating to at least one of the passenger's personal preferences, an in-flight meal schedule, and an automated cabin lighting schedule.

6. The system of claim 1, wherein the one or more processors are further configured to generate data defining a dynamic event schedule is further operable to generate auxiliary data for an event defining the associated action output.

7. The system of claim 1, wherein the one or more processors are further configured to determine a new event for the dynamic event schedule based on the received sensor inputs.

8. The system of claim 1, wherein the one or more processors are further configured to output the dynamic event schedule as an interactive interface.

9. A method of dynamic travel event scheduling, comprising:
   retrieving stored data including information relating to a passenger's itinerary, the itinerary including at least one scheduled journey;
   generating data defining a dynamic event schedule based on the retrieved data, the dynamic event schedule including at least a sleep event, a wake event, and a post-wake event, each associated with a respective timing parameter, and wherein said wake and post-wake events are each associated with at least one trigger sensor input and with at least one action output; and
   during the at least one scheduled journey:
      receiving one or more sensor inputs providing information on the physiological state of the passenger and/or environmental conditions in the vicinity of the passenger;
      determining, in response to the received one or more sensor inputs, one or more affected wake and post-wake events included in the dynamic event schedule that are associated with a corresponding trigger sensor input; and
      in response to said determining of said one or more affected events, adjusting respective timing parameters of the one or more affected events, and causing the one or more action outputs of an affected event to control the passenger's travel environment.

10. A non-transitory computer readable medium comprising machine executable instructions stored thereon that when executed perform a method in accordance with claim 9.

11. The system of claim 1, wherein the sensor inputs providing information on the environmental conditions in the vicinity of the passenger are received from one or more of: temperature sensor(s), lighting sensor(s), humidity sensor(s), noise sensor(s), and altitude sensor(s).

12. The system of claim 1, wherein the sensor inputs providing information on the physiological state of the passenger are received from one or more of: a body movement sensor, a sleep phase sensor, an eye movement sensor, a heart rate sensor, a body temperature sensor and an ingestible sensor.

* * * * *